J. H. RUDOLPH.
KNOCKDOWN PLANT TUB.
APPLICATION FILED AUG. 3, 1916.
1,205,028.
Patented Nov. 14, 1916.
Fig. 1.
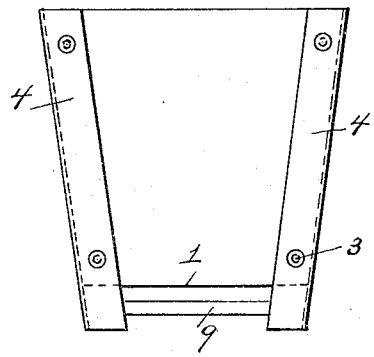
Fig. 2.
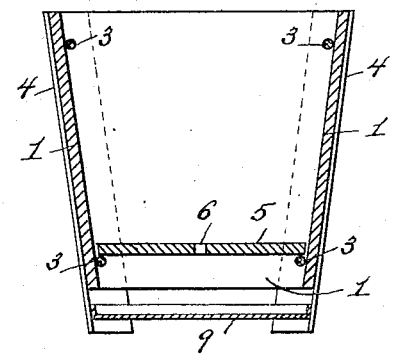
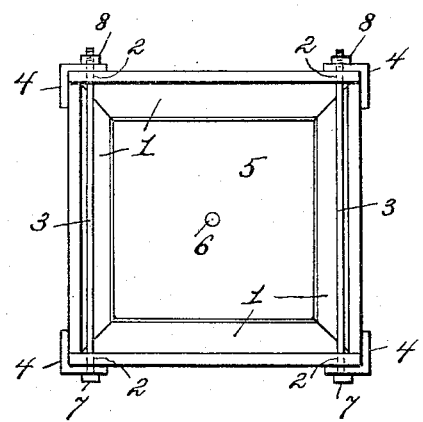
Fig. 3.
WITNESSES:
Clifford A. Alliston.
INVENTOR
Jean Henry Rudolph
BY
Fredk C. Fischer.
ATTORNEY

UNITED STATES PATENT OFFICE.

JEAN HENRY RUDOLPH, OF ESSEX FELLS, NEW JERSEY.

KNOCKDOWN PLANT-TUB.

1,205,028.  Specification of Letters Patent.  Patented Nov. 14, 1916.

Application filed August 3, 1916. Serial No. 112,931.

*To all whom it may concern:*

Be it known that I, JEAN HENRY RUDOLPH, a citizen of the United States, residing in Essex Fells, in the county of Essex and State of New Jersey, have invented certain new and useful Improvements in Knockdown Plant-Tubs, of which the following is a full, clear, and exact description, such as will enable others skilled in the art to which it pertains to make, construct, and use the same, reference being had to the accompanying drawings, and to numerals of reference marked thereon, forming a part of this specification.

My invention has relation to knock-down plant tubs, for growing plants, and the objects of my invention are to provide a device of this character which is simple in construction, the parts of which can be securely and adjustably held together, and in which one of the side walls or the bottom thereof, can be conveniently removed without disturbing the soil about the roots of the plant, and therefore without any danger of injury to the roots.

A further object is to provide a knockdown tub or receptacle, the parts of which can be stored in a small space.

With these and other objects in view, my improved tub or receptacle consists of four removable side walls, a removable bottom, four corner angles, and four tie rods.

In the accompanying drawings, the preferred form of my invention has been illustrated, in which—

Figure 1 represents a side elevation of a plant tub constructed in accordance with the present invention. Fig. 2 represents a vertical transverse section taken through the tub; and Fig. 3 represents a plan view of the same.

Similar numerals of reference denote corresponding parts in all of the figures of the drawings.

Referring to the drawings, 1 designates the side walls of the tub or receptacle, four being shown, two of which, near the upper and lower corners thereof, are provided with apertures 2, to receive the tie rods 3. The four side walls 1 are securely and adjustably held together in the manner indicated in Fig. 3 of the drawings, by means of the four corner angles 4, the length of which preferably exceeds the length of the side walls, as clearly indicated in Figs. 1 and 2 of the drawings, in order to provide convenient supports for said tub or receptacle, and to further provide a necessary air space between the bottom of the tub and the ground, to afford proper air circulation, thus at all times maintaining the bottom and the side walls of the tub in a condition to prevent the same from rotting.

From an inspection of Figs. 2 and 3 of the drawings, it will be seen that the tie rods 3 pass through but two of the side walls 1, and that the remaining two side walls are not provided with apertures 2, in order that the edges of two of the side walls may be clamped between the edges of the other two side walls provided with the apertures, so that either one or both of said side walls can be conveniently removed, without disturbing the contents of the receptacle, thus permitting an inspection to be made of the roots of the plant without danger of injury to the same. This construction also enables the ready removal of one or all of the side walls of the tub when it becomes necessary to replace one or more of the side walls, due to injury or rot.

The side walls 1, which are not provided with the apertures 2, are prevented from inward or outward displacement by the corner angles 4, and the tie rods 3, between which they are interposed and the side walls 1, which are provided with the tie rod receiving apertures 2, are prevented from inward and outward displacement by the corner angles 4 and the edges of the before-described side walls 1.

Loosely mounted upon the two lower tie rods 3, is a removable bottom 5, preferably provided with a central aperture 6, to permit the surplus water in the tub to escape therefrom. The dimensions of the removable bottom, in its preferred form, are a trifle smaller than the dimensions of the inside of the tub, at that point where the lower tie rods pass therethrough, in order to provide a very narrow space between the four edges of the bottom and the four side walls of the tub, which space will permit drainage, in addition to the central aperture 6, and will further permit a certain amount of air to circulate from under the bottom of the tub in an upward direction along the side walls of the tub, thereby preventing the bottom and side walls from rotting.

Convenient handles, not shown, may be secured to two opposite side walls of the tub or receptacle, by which the tub can be lifted when it is desired to move the same.

One end of the tie rods 3 which pass through the apertures 2 of the side walls 1, are provided with heads 7, and the other ends thereof, are screw-threaded, to be engaged by nuts 8, whereby the corner angles and side walls are securely and adjustably secured together.

Removably secured within the lower portions of the corner angles 4 of my improved device, and held therein by friction or otherwise, is a tray 9, adapted to receive any surplus water or earth which might percolate through the space between the edges of the removable bottom and the side walls of the receptacle or tub.

Experience has demonstrated that the organization above described is a highly efficient one, and while the device described is the preferred embodiment of my present invention, I do not care to restrict myself to the exact details of construction, combination and arrangements herein set forth, it being obvious that minor variations thereof, not involving the exercise of invention, may be made by any skilled mechanic, and such departures from what is herein described and claimed, I consider within the scope and terms of my claims.

Having thus described my invention, what I desire to claim and secure by Letters Patent is:—

1. A knock-down plant tub comprising a plurality of removable side walls, a plurality of corner angles extending along the entire edges of said side walls and inclosing the edges thereof, upper and lower means passing through the corner angles and some of the side walls for adjustably securing said side walls and corner angles together, and a removable bottom located within said plant tub and supported by the said lower means.

2. A knock-down plant tub comprising a plurality of removable side walls, some of which are provided with apertures, a plurality of corner angles, one side thereof being provided with apertures, said corner angles extending along the entire edges of the side walls and inclosing said edges, upper and lower tie rods passing through the apertures in the corner angles and the apertures in the apertured side walls for adjustably securing the side walls and corner angles together, and a removable bottom loosely located within said plant tub and supported upon the lower tie rods.

3. A knock-down plant tub comprising a plurality of removable side walls, a plurality of corner angles extending along the entire edges of said side walls and inclosing the edges thereof, upper and lower means passing through the corner angles and some of the side walls for adjustably securing said side walls and corner angles together, a removable bottom located within said plant tub and supported by the said lower means and a tray removably secured below the bottom of the plant tub and frictionally held in position by the corner angles.

This specification signed and witnessed this 28th day of July, 1916.

JEAN HENRY RUDOLPH.

Witnesses:
 FRED'K C. FISCHER,
 CLIFFORD A. ALLISTON.

Copies of this patent may be obtained for five cents each, by addressing the "Commissioner of Patents, Washington, D. C."